US010166944B2

(12) United States Patent
Banno

(10) Patent No.: US 10,166,944 B2
(45) Date of Patent: Jan. 1, 2019

(54) AIR BAG SYSTEM

(71) Applicant: TOYODA GOSEI CO., LTD., Kiyosu-shi, Aichi-ken (JP)

(72) Inventor: Yoshiteru Banno, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 195 days.

(21) Appl. No.: 15/420,307

(22) Filed: Jan. 31, 2017

(65) Prior Publication Data
US 2017/0136978 A1   May 18, 2017

Related U.S. Application Data

(63) Continuation of application No. 14/857,024, filed on Sep. 17, 2015, now Pat. No. 9,598,038.

(30) Foreign Application Priority Data

Oct. 24, 2014   (JP) .................................. 2014-217638

(51) Int. Cl.
*B60R 21/203*   (2006.01)
*B60Q 5/00*   (2006.01)
*B60R 21/215*   (2011.01)
*B60R 21/2165*   (2011.01)

(52) U.S. Cl.
CPC .......... *B60R 21/2037* (2013.01); *B60Q 5/003* (2013.01); *B60R 21/215* (2013.01); *B60R 21/2165* (2013.01); *B60R 21/21656* (2013.01)

(58) Field of Classification Search
CPC ............................. B60R 21/2037; B60Q 5/003
USPC ................. 280/728.2, 731; 200/61.55, 61.54
See application file for complete search history.

(56) References Cited

U.S. PATENT DOCUMENTS

| 4,785,144 A | 11/1988 | Fosnaugh et al. |
| 5,350,190 A | 9/1994 | Szigethy |
| 5,931,492 A * | 8/1999 | Mueller ............... B60R 21/2037 200/61.55 |

(Continued)

FOREIGN PATENT DOCUMENTS

| JP | 2007-050876 A | 3/2007 |
| JP | 2008-179231 A | 8/2008 |

(Continued)

OTHER PUBLICATIONS

Office Action dated Aug. 29, 2017 issued in corresponding JP patent application No. 2014-217638 (and English translation).

*Primary Examiner* — Keith J Frisby
(74) *Attorney, Agent, or Firm* — Posz Law Group, PLC

(57) ABSTRACT

An air bag system includes: a pad including a ceiling wall portion which covers an air bag and a side wall portion which extends into a cylindrical shape; a mounting base which holds the pad and holds the air bag by causing an annular retainer; and switch members which make up a horn switch mechanism so that the mounting base is mounted on a steering wheel main body, wherein: the switch members are provided below the air bag; and movable-side members are provided so that a portion at a side facing the inlet opening on an upper side thereof is brought into abutment with the retainer via a circumferential edge of the inlet opening of the air bag and a portion at a side thereof is brought into abutment with a lower surface of the side wall portion of the pad.

3 Claims, 14 Drawing Sheets

(56) References Cited

U.S. PATENT DOCUMENTS

| | | | |
|---|---|---|---|
| 6,592,141 B1 * | 7/2003 | Dancasius | B60R 21/2037 280/728.1 |
| 2004/0108690 A1 | 6/2004 | Schutz et al. | |
| 2006/0208470 A1 | 9/2006 | Tsujimoto et al. | |
| 2008/0211214 A1 | 9/2008 | Ishiguro et al. | |
| 2010/0066066 A1 | 3/2010 | Sakurai et al. | |
| 2012/0074672 A1 | 3/2012 | Iida et al. | |
| 2012/0279835 A1 | 11/2012 | Shellabarger et al. | |

FOREIGN PATENT DOCUMENTS

| | | |
|---|---|---|
| JP | 2010-069936 A | 4/2010 |
| JP | 2012-071716 A | 4/2012 |

* cited by examiner

AIR BAG SYSTEM

CROSS-REFERENCE TO RELATED APPLICATION(S)

This application is a continuation of U.S. patent application Ser. No. 14/857,024 filed on Sep. 17, 2015 and entitled AIR BAG SYSTEM, and is based upon and claims the benefit of priority from Japanese Patent Application No. 2014-217638, filed on Oct. 24, 2014, the entire contents of which are incorporated herein by reference.

BACKGROUND

1. Field of the Invention

The present invention relates to an air bag system including a horn switch mechanism which is provided on an upper side of a boss portion of a steering wheel of a vehicle which is situated near the center of the steering wheel.

2. Description of the Related Art

Conventionally, this type of air bag system includes a pad which is disposed on an upper side of a boss portion of a steering wheel, a mounting base on which the pad and a folded air bag are mounted and a plurality of switch members which make up a horn switch mechanism, which are mounted near an outer circumferential edge of the mounting base and which are configured to attach the mounting base to a steering wheel main body (refer to JP-A-2012-071716, for example). The pad includes a ceiling wall portion which covers the folded air bag from thereabove and which has a door portion configured to open by being pushed by the air bag which is being inflated and a side wall portion which extends into a cylindrical shape from a lower surface of the ceiling wall portion which lies around the circumference of the door portion so as to connect to the mounting base at a lower end thereof and which covers circumferentially a side of the folded air bag. Additionally, the air bag is fastened to be held to the mounting base around a circumferential edge of an inner circumferential surface of an inflation gas inlet opening of the air bag by an annular retainer which is attached to be fixed to the mounting base. Further, the switch members each include a movable-side member and an assembling pin as a fixed-side member. The movable-side member is disposed on an upper side, has a movable-side contact and is assembled to an assembling seat of the mounting base. The fixed-side member is disposed on a lower side, has a fixed-side contact which corresponds to the movable-side contact at an upper end side and is attached to the steering wheel main body at a lower-end side thereof which projects downwards from the mounting base. Furthermore, the switch members each include a coil spring which is disposed around the assembling pin as a biasing device for biasing a mounting base side upwards from a assembling pin side thereof. Additionally, a collar portion is provided at an upper end of the assembling pin so as to make up a controlling device for controlling a spacing distance between the movable-side contact and the fixed-side contact, and the collar portion is locked at a circumferential edge of an upper side of the assembling seat.

In the air bag system described above, however, the switch members are provided on the area outside the folded air bag on a mounting base, and further, the switch members are disposed so that the upper side of the movable-side member is brought into abutment with the lower end face of the side wall portion of the pad. Because of this, the assembling seat of the mounting base where the switch members are assembled is disposed further outwards than the air bag accommodating area. Additionally, the side wall portion of the pad is formed thick partially so as to be disposed further outwards than the air bag accommodating area to correspond to the movable-side members of the switch members which are assembled to the assembling seat. As a result of this, the air bag system itself is enlarged in size in such a way as to extend largely outwards from the circumference of the inflation gas inlet opening of the air bag.

SUMMARY

The invention has been made with a view to solving the problem and an object thereof is to provide an air bag system which includes a horn switch mechanism which can be installed compact in the air bag system as seen from thereabove even though the air bag system is configured so as to be installed on an upper portion of a boss portion of a steering wheel.

According to a first aspect of the invention, there is provided an air bag system including: a pad including a ceiling wall portion which covers an air bag which is folded from thereabove and which has a door portion which is pushed to open by the air bag when the air bag is inflated and a side wall portion which extends into a cylindrical shape from a lower surface of the ceiling wall portion at a circumference of the door portion to thereby cover sides of the air bag which is folded and disposed on an upper side of a boss portion of a steering wheel; a mounting base which holds the pad by causing the side wall portion to be connected thereto and which holds the air bag by causing an annular retainer which fastens a circumferential edge on an inner circumferential surface side of an inflation gas inlet opening which is provided in the air bag to be fixed thereto; and a plurality of switch members which make up a horn switch mechanism which are mounted on assembling seats near an outer circumferential edge of the mounting base so that the mounting base can be mounted on a steering wheel main body, the switch member including: a movable-side member which is disposed on an upper side, which has a movable-side contact and which is assembled to the assembling seat of the mounting base; a fixed-side member which is disposed on a lower side, which has a fixed-side contact which corresponds to the movable-side contact at an upper end side and which is attached to the steering wheel main body at a lower end side which projects downwards from the mounting base; a biasing device which biases upwards a side facing the mounting base from a side facing the fixed-side member; and a control device which controls a spacing distance of the movable-side contact from the fixed-side contact, wherein: the switch members are provided below the air bag which is folded on the mounting base; and the movable-side members are provided so that a portion at a side facing the inlet opening on an upper side thereof is brought into abutment with the retainer via a circumferential edge of the inlet opening of the air bag and a portion at a side thereof which lies spaced away from the inlet opening on the upper side is brought into abutment with a lower surface of the side wall portion of the pad.

In the air bag system according to the first aspect of the invention, since the switch members are provided below the air bag which is folded on the mounting base, the assembling seats of the mounting base are also disposed below the folded air bag accordingly and are provided close to the inlet opening of the air bag. This allows the mounting base to position its outer circumferential edge close to the inlet opening of the air bag, whereby the mounting base can be configured compact when seen from thereabove. In association with this, the side wall portion of the pad can also be configured without providing a portion which is spaced largely away from the inlet opening of the air bag, as a result of which the whole of the air bag system can be configured compact when seen from thereabove.

In depressing the pad to activate the horn switch, on the upper surfaces of the movable-side members, the portions at the sides facing the inlet opening of the air bag are depressed by the retainer which is fixed to the mounting base to which the side wall portion of the pad is connected, and the portions at the sides lying spaced away from the inlet opening are depressed to the lower surface of the side wall portion of the pad. Thus, the movable-side members are prevented from being inclined, whereby the upper surfaces of the movable-side members can be lowered uniformly. Because of this, although the mounting base is made compact, a stable horn stroke can be ensured, thereby making it possible to prevent a reduction in feeling a sensation of operating the pad.

Consequently, in the air bag system of the first aspect of the invention, even in the event that the air bag system is configured to be mounted on the upper portion of the boss portion of the steering wheel, the air bag system can be mounted compact when seen from thereabove, and in operating the horn switch, a good operation feeling can be ensured.

According to a second aspect of the invention, there is provided an air bag system including: a pad including a ceiling wall portion which covers an air bag which is folded from thereabove and which has a door portion which is pushed to open by the air bag when the air bag is inflated and a side wall portion which extends into a cylindrical shape from a lower surface of the ceiling wall portion at a circumference of the door portion to thereby cover sides of the air bag which is folded and disposed on an upper side of a boss portion of a steering wheel; a mounting base which holds the pad by causing the side wall portion to be connected thereto and which holds the air bag by causing an annular retainer which fastens a circumferential edge on an inner circumferential surface side of an inflation gas inlet opening which is provided in the air bag to be fixed thereto; and a plurality of switch members which make up a horn switch mechanism which are mounted on assembling seats near an outer circumferential edge of the mounting base so that the mounting base can be mounted on a steering wheel main body, the switch member including: a movable-side member which is disposed on an upper side, which has a movable-side contact and which is assembled to the assembling seat of the mounting base; a fixed-side member which is disposed on a lower side, which has a fixed-side contact which corresponds to the movable-side contact at an upper end side and which is attached to the steering wheel main body at a lower end side which projects downwards from the mounting base; a biasing device which biases upwards a side facing the mounting base from a side facing the fixed-side member; and a control device which controls a spacing distance of the movable-side contact from the fixed-side contact, wherein: the plurality of switch members are provided below the air bag which is folded on the mounting base; and an inner plate which extends outwards from below the retainer so as to be brought into abutment substantially wholly with upper sides of the movable-side members of the switch members is fastened together with a circumferential edge of the inlet opening of the air bag by the retainer to thereby be fixedly attached to the mounting base.

In the air bag system according to the second aspect of the invention, since the switch members are provided below the air bag which is folded on the mounting base, the assembling seats of the mounting base are also disposed below the folded air bag accordingly and are provided close to the inlet opening of the air bag. This allows the mounting base to position its outer circumferential edge close to the inlet opening of the air bag, whereby the mounting base can be configured compact when seen from thereabove. In association with this, the side wall portion of the pad can also be configured without providing a portion which is spaced largely away from the inlet opening of the air bag, as a result of which the whole of the air bag system can be configured compact when seen from thereabove.

In depressing the pad to activate the horn switch, the upper surfaces of the movable-side members are substantially wholly depressed by the inner plate which is fastened together with the circumferential edge of the inlet opening of the air bag by the retainer. Thus, the movable-side members are prevented from being inclined, whereby the upper surfaces of the movable-side members can be lowered uniformly. Because of this, although the mounting base is made compact, a stable horn stroke can be ensured, thereby making it possible to prevent a reduction in feeling a sensation of operating the pad.

Consequently, in the air bag system of the second aspect of the invention, too, even in the event that the air bag system is configured to be mounted on the upper portion of the boss portion of the steering wheel, the air bag system can be mounted compact when seen from thereabove, and in operating the horn switch, a good operation feeling can be ensured.

Additionally, in the air bag system according to the first and second aspects of the invention, in the event that the retainer is formed substantially into a quadrangular annular shape in which securing devices which are fixed to the mounting base are provided in four front, rear, left and right corners thereof so as to extend downwards therefrom, it is desirable that three switch members are used as the plurality of switch members and are provided in left and right positions on a front side of the circumference of the inlet opening of the air bag which lie near and behind the front securing devices of the retainer and a central position in a left-to-right direction of the retainer on a rear side which lies near the retainer.

According to the configurations described above, the switch members can be provided nearest to the inlet opening of the air bag without interfering with the securing devices in the four corners of the retainer, which can contribute further to making the air bag system compact. Additionally, since the switch members are disposed in the three locations which lie radially about the inlet opening of the air bag, even though the portions where to depress the pad scatter in different positions in the front-to-rear and left-to-right directions, when activating the horn switch, in any one of the switch members, the movable-side contacts can be brought into contact with the fixed-side contact with good balance, thereby making it possible to maintain the good operation feeling.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
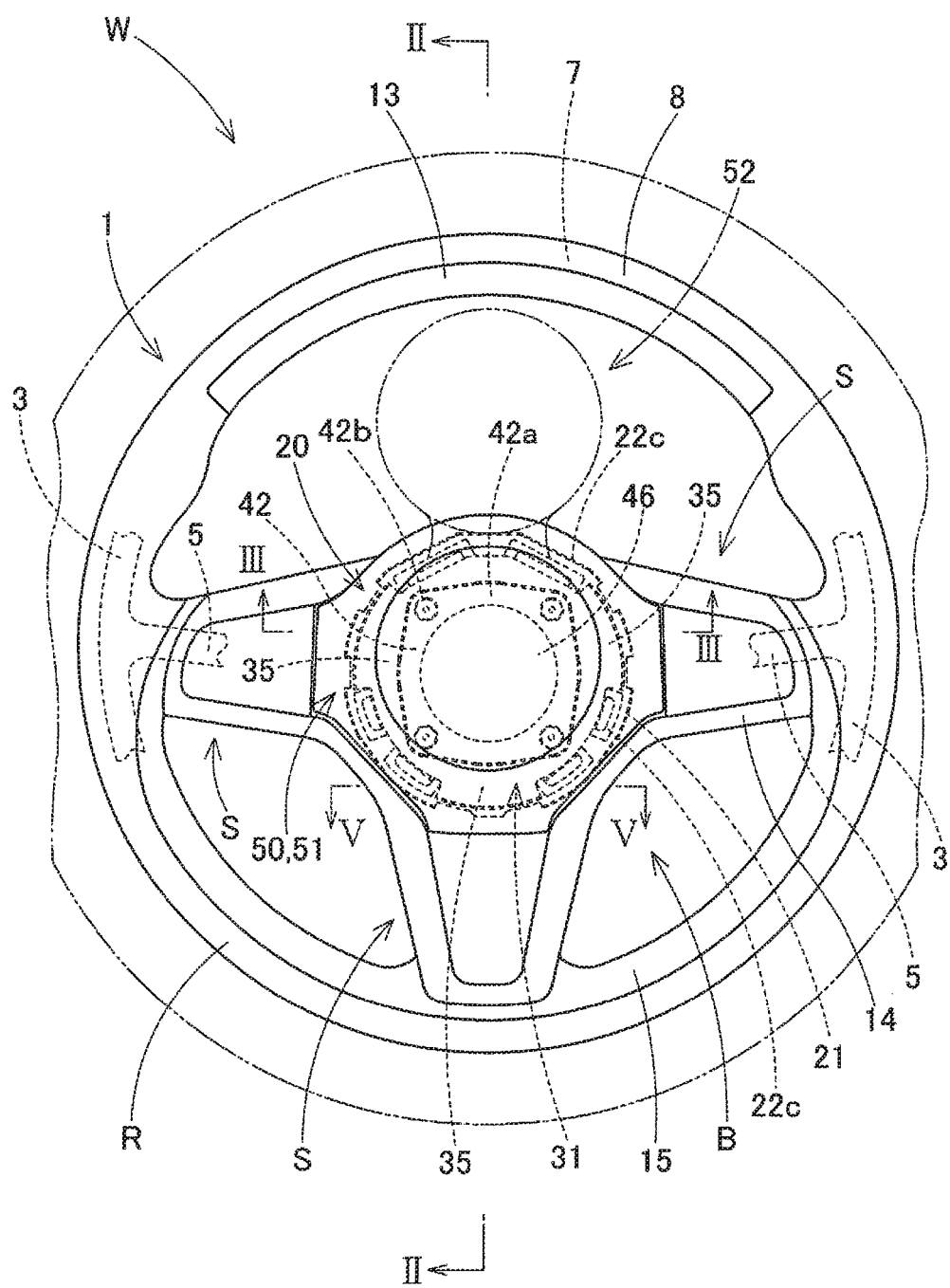
FIG. 1 is a schematic plan view of a steering wheel in which an air bag system of a first embodiment of the invention is installed.

Hereinafter, a first embodiment of the invention will be described based on drawings. A steering wheel W in which an air bag system 20 of a first embodiment is installed includes, as shown in FIG. 1, a steering wheel main body 1 which has a ring portion R which is gripped on when the steering wheel is turned, a boss portion B which is disposed at a center of the ring portion R, and spoke portions S which connect the ring portion R and the boss portion B together, and an air bag system 20 which is provided on an upper portion of the boss portion B.

When referred to in this specification, up-to-down, left-to-right and front-to-rear directions are based on a state where a vehicle is steered to travel straight ahead with the steering wheel W which is connected to a steering shaft SS (refer to FIG. 2) of the vehicle with nuts. The up-to-down direction corresponds to an up-to-down direction which follows an axial direction of the steering shaft SS. The left-to-right direction corresponds to a left-to-right direction of the vehicle which intersects an axis of the steering shaft SS at right angles. The front-to-rear direction corresponds to a front-to-rear direction of the vehicle which intersects the axis of the steering shaft SS at right angles (refer to FIG. 1).

The steering wheel main body 1 includes a core metal 2 which is provided to allow the ring portion R, the boss portion B and the spoke portions S to be connected together and a covering layer 7 of urethane or the like which covers the ring portion R and portions of the metal core 2 which correspond to portions of the spoke portions S which lie near the ring portion R. A leather 8 is wound around a surface of the covering layer 7. Further, decorative garnishes 13, 15 are provided on inner circumferential sides of a front portion and a rear portion of the ring portion R, respectively.

The core metal 2 includes a ring core metal portion 3 which is disposed in the ring portion R, a boss core metal portion 4 which is disposed in the boss portion B so as to be connected with the steering shaft SS and spoke core metal portions 5 which are disposed in the left and right spoke portions S so as to connect the ring core metal portion 3 and the boss core metal portion 4 together. In this embodiment, the spoke core metal portions 5 are provided only at the two left and right spoke portions S on a front side of the ring portion R, and a bezel 14 is provided on the spoke portions S on a rear side of the ring portion R so as to surround the circumference of a pad 50, which will be described later.

A fixing portion 10 is provided on a circumferential edge of the boss core metal portion 4 of the core metal 2, and this fixing portion 10 fixes in place assembling pins 84 of switch members 70, which will be described later, of the air bag system 20 (refer to FIGS. 2, 3). The fixing portion 10 includes locking holes 11 and locking pins 12. The locking holes 11 penetrate the fixing portion 10 into a tapered shape which narrows in diameter as it extends downwards. The locking pins 12 are disposed on a lower side of the boss core metal portion 4 to lock locking head portions 86a of the assembling pins 84. The locking pins 12 are each formed of a spring material which can deflect along a lower surface of the boss core metal portion 4 in a restorable fashion.

Figure 2:
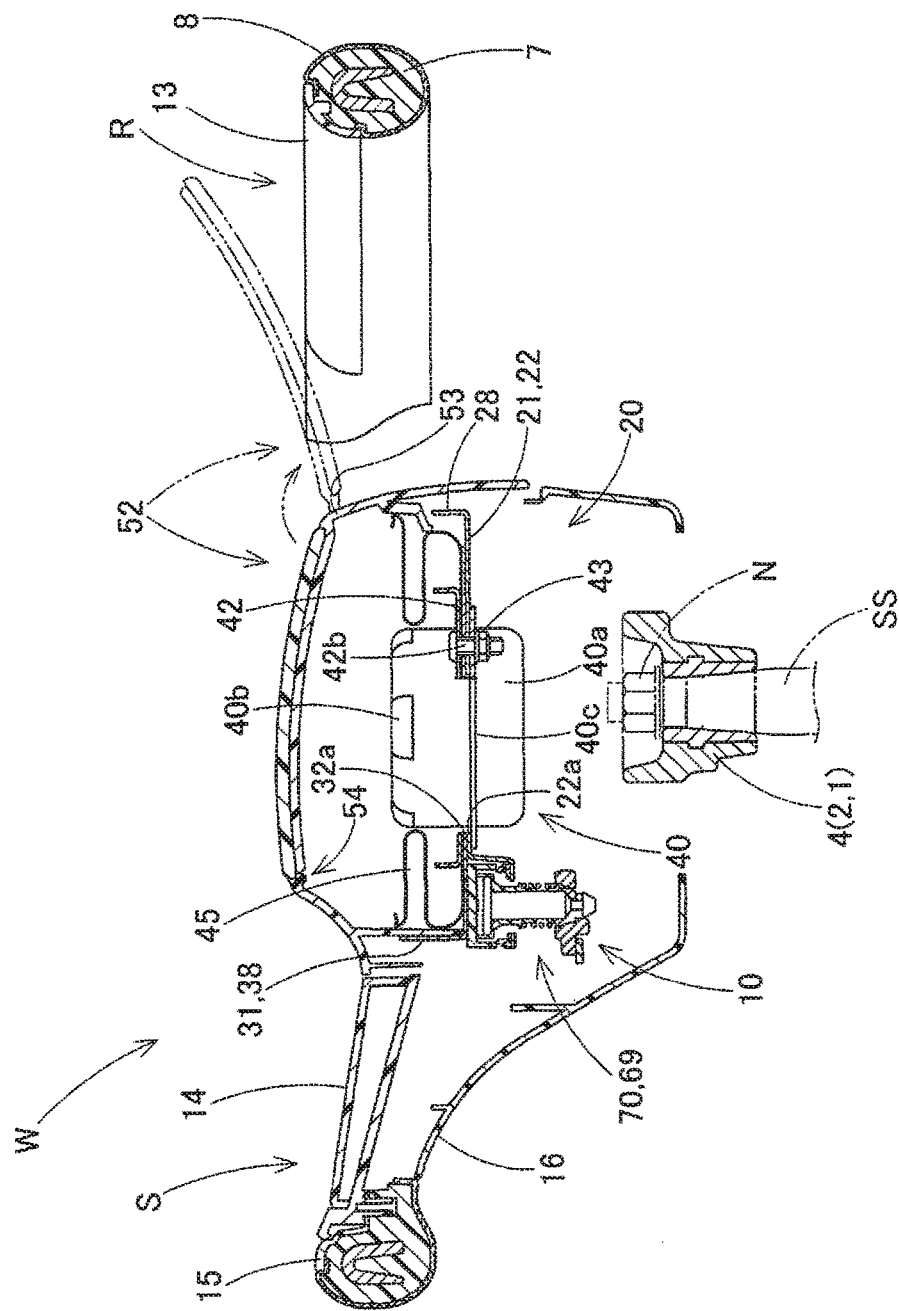
FIG. 2 is a schematic vertical sectional view of the steering wheel of the first embodiment which is taken along a line II-II in FIG. 1.

The steering wheel main body 1 includes a lower cover 16 on a lower side of the boss portion B (refer to FIG. 2).

Figure 3:
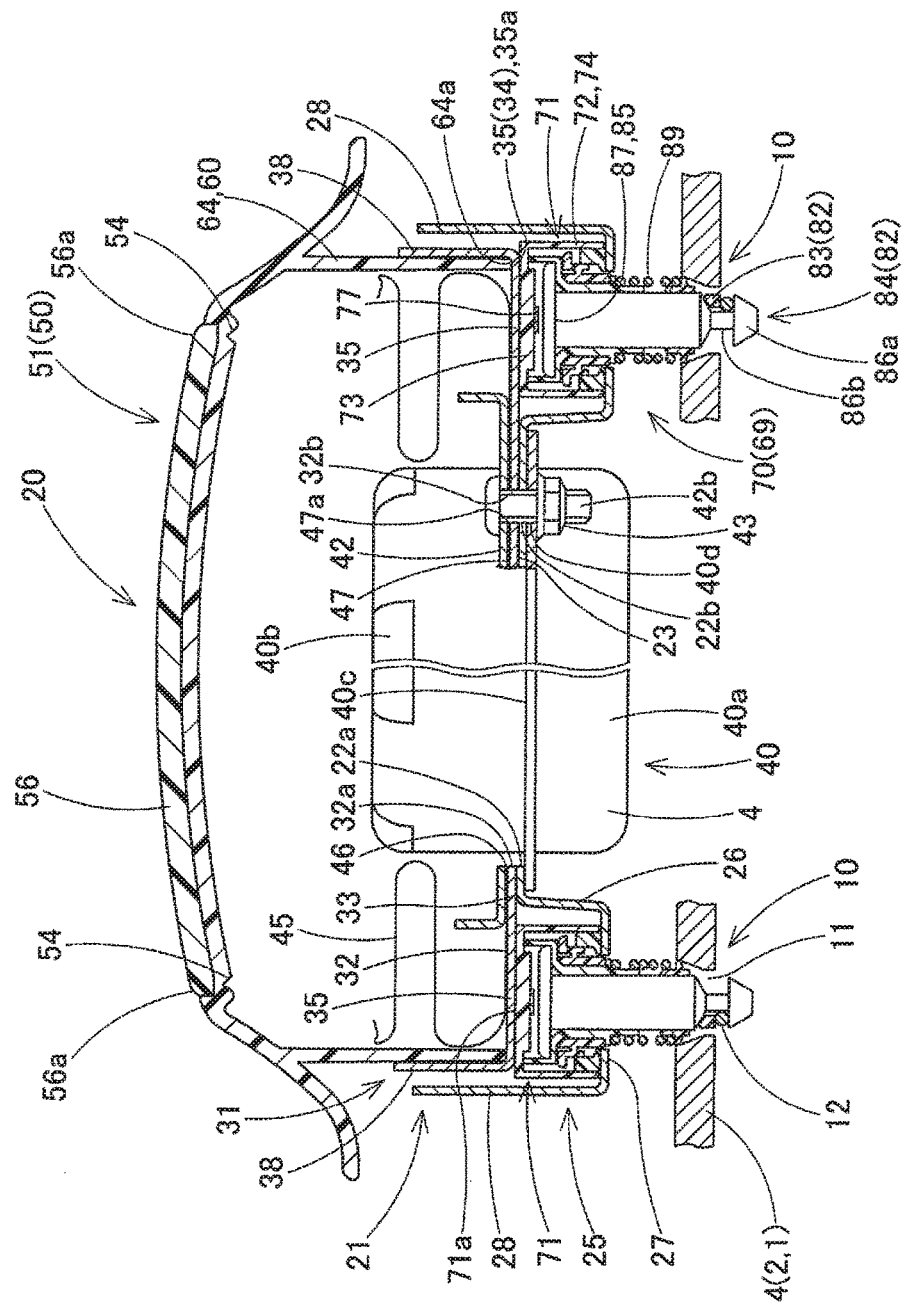
FIG. 3 is a schematic vertical sectional view of the steering wheel of the first embodiment which is taken along a line III-III in FIG. 1.

As shown in FIGS. 1 to 3, the air bag system 20 includes an air bag 45 which inflates when inflation gas flows thereinto, an inflator 40 which supplies the inflation gas into the air bag 45, the pad 50 of synthetic resin which is disposed on an upper side of the boss portion B so as to cover the air bag 45 which is folded, a mounting base 21 of a metal plate which holds the air bag 45, the inflator 40 and the pad 50, an inner plate 31 of a metal plate, and a retainer 42.

The air bag 45 is designed to inflate into a substantially thick disc shape resembling a spherical shape when it inflates completely and includes an inlet opening 46 which is opened into a circular shape on a lower side thereof for allowing the inflation gas to flow thereinto. Four through holes 47a are formed along a circumferential edge 47 of the inlet opening 46 for penetration of bolts 42b as securing devices of the retainer 42.

Figure 6:
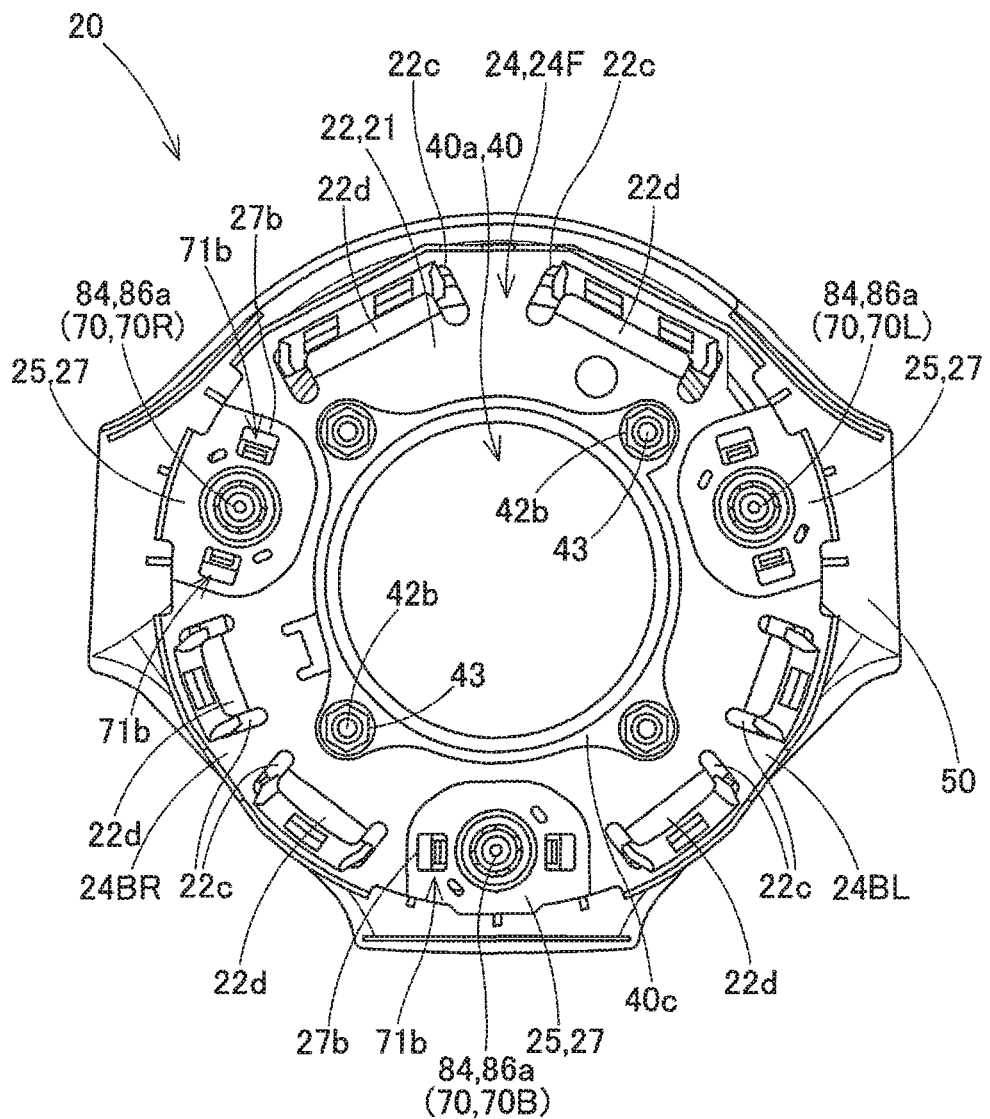
FIG. 6 is a bottom view of the air bag system of the first embodiment.
Figure 7:
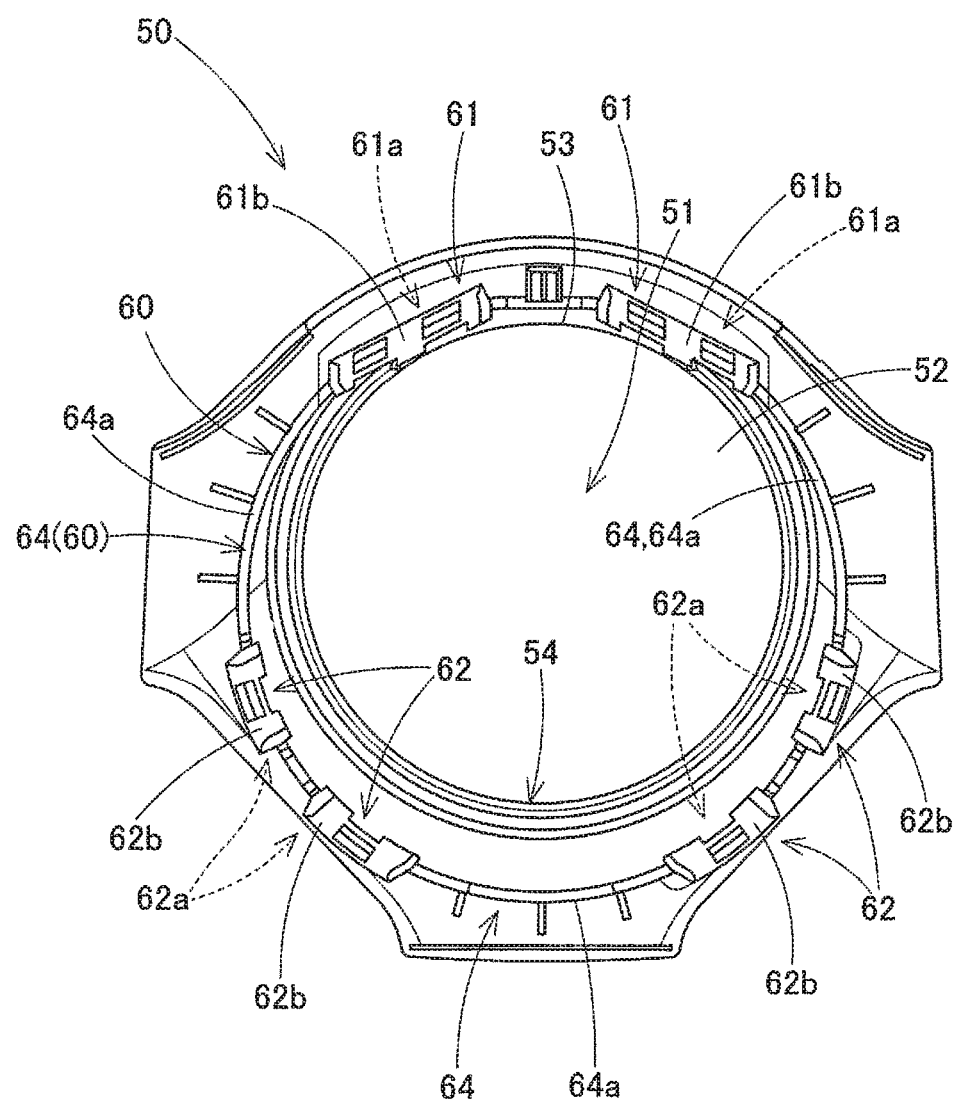
FIG. 7 is a bottom view of the pad of the first embodiment.
Figure 8:
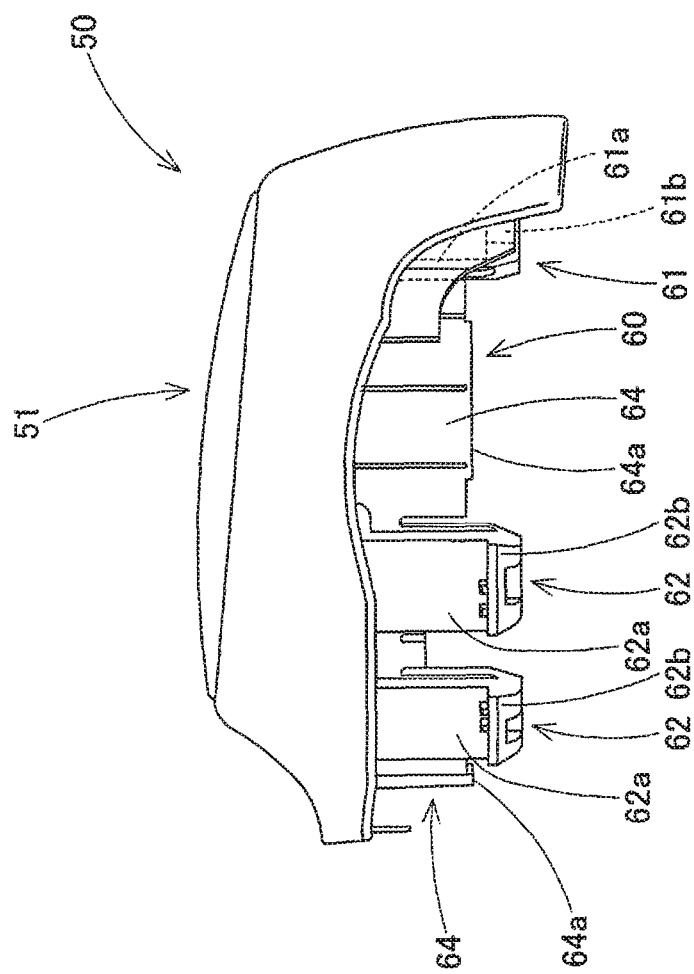
FIG. 8 is a side view of the pad of the first embodiment.
Figure 9:
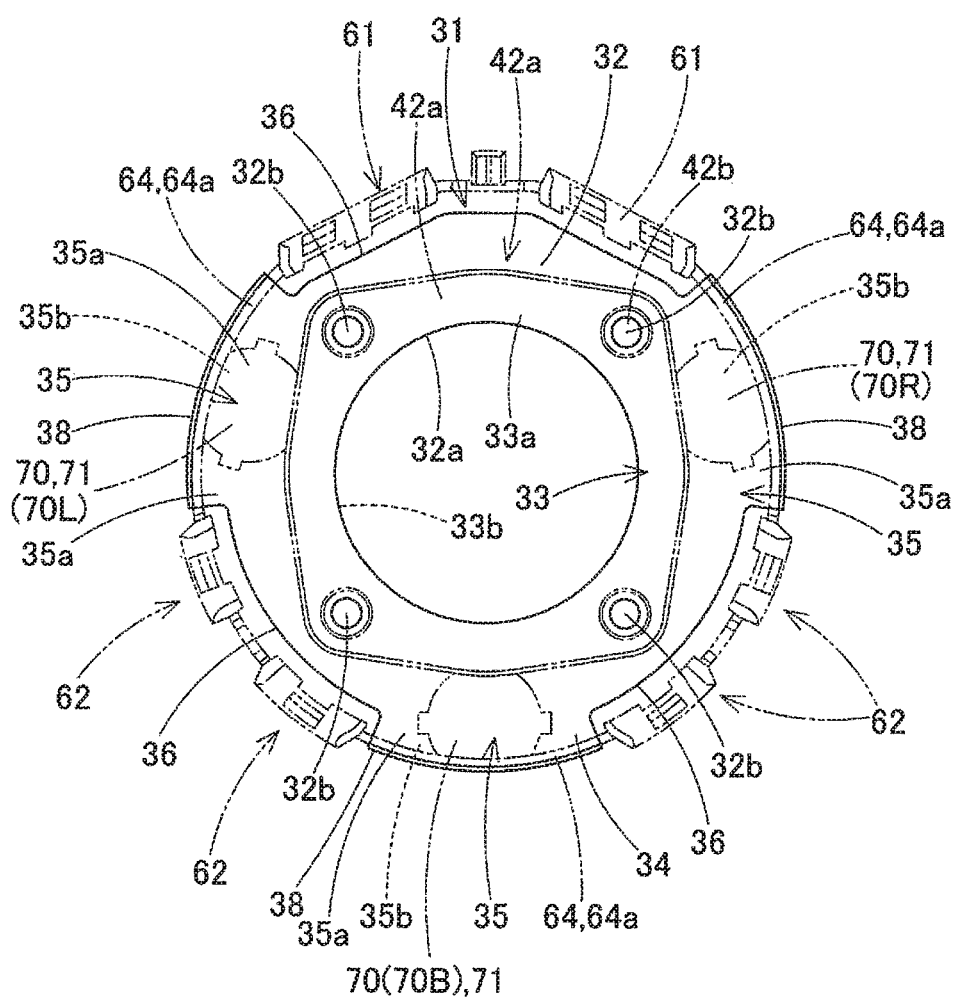
FIG. 9 is a plan view of an inner plate of the first embodiment.
Figure 10:
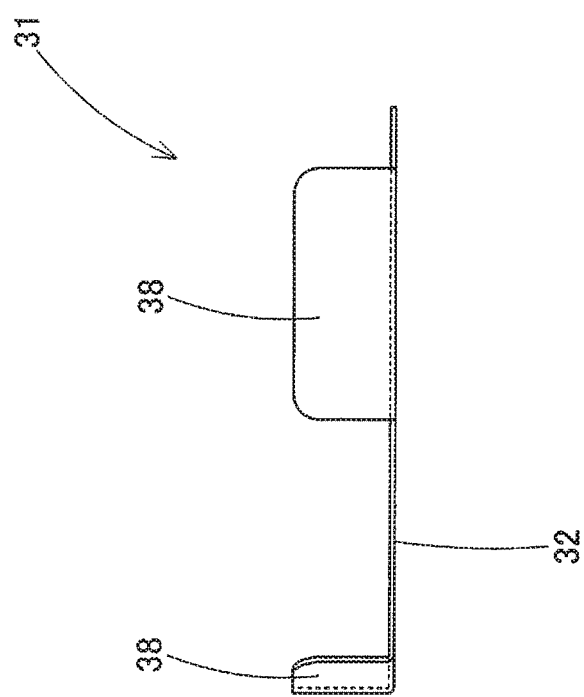
FIG. 10 is a side view of the inner plate of the first embodiment.

The inflator 40 includes a cylindrical main body portion 40a which includes a plurality of gas outlet ports 40b from which an inflation gas is discharged at an upper portion thereof. A quadrangular annular flange portion 40c (refer to FIG. 6) is provided on an outer circumferential surface of the main body portion 40a so as to project therefrom. Through holes 40d are formed in the flange portion 40c through which bolts 42b of the retainer 42 are passed.

As shown in FIGS. 1 to 4, 9, the retainer 42 includes a quadrangular ring-shaped metal plate main body 42a, and the bolts 42b (refer to FIG. 6) are provided in four corners of the main body 42a so as to project downwards. The retainer 42 is provided on the circumferential edge 47 of the inlet opening 46 in the air bag 45. The bolts 42b are caused to penetrate sequentially the through holes 47a of the air bag 45, through holes 32b of the inner plate 31, through holes 22b of the mounting base 21 and through holes 40d of a flange portion 40c of the inflator 40, and nuts 43 are fastened on to the corresponding bolts 42b, whereby the air bag 45, the inner plate 31 and the inflator 40 are mounted on the mounting base 21.

As shown in FIGS. 1 to 6, the pad 50 is formed from a synthetic resin such as an olefin based thermoplastic elastomer and is provided on the upper side of the boss portion B near the center of the steering wheel W. The pad 50 includes a ceiling wall portion 51 and a side wall portion 60. The ceiling wall portion 51 covers the air bag 45 which is accommodated in an interior of the boss portion B in a folded state from thereabove. The side wall portion 60 extends into a substantially cylindrical shape from a lower surface of the ceiling wall portion 51 to cover front, rear, left and right side portions (an outer circumferential side) of the folded air bag 45.

A disc-shaped door portion 52 is provided in the ceiling wall portion 51, and this door portion 52 is pushed to open to the front by the air bag 45 which is being inflated. A hinge portion 53 is provided on a front edge side of the door portion 52, and a thin breakable portion 54 having a substantially arc shape when seen from thereabove is provided on the circumference of the door portion 52.

Figure 4:
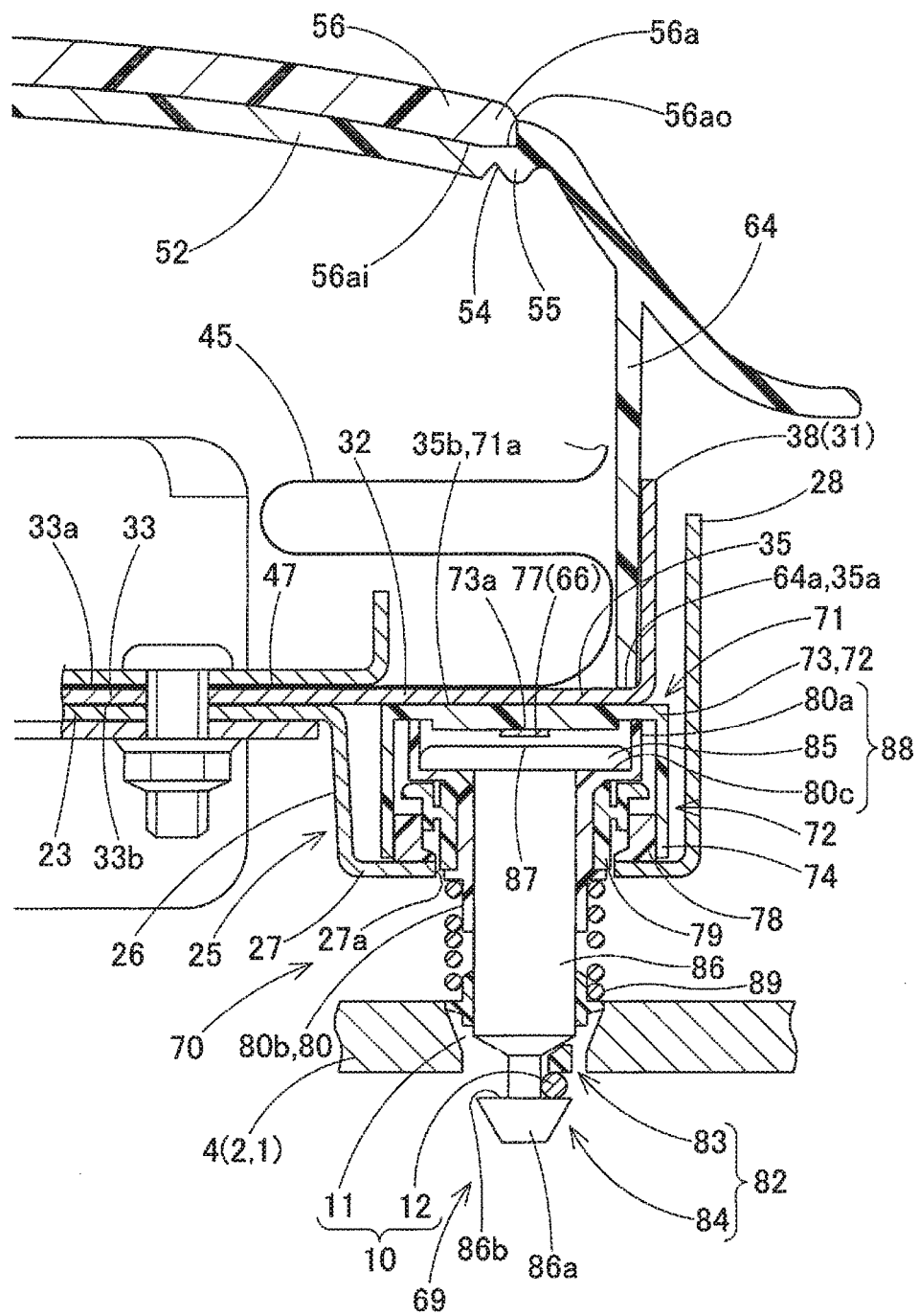
FIG. 4 is an enlarged schematic vertical sectional view near a right-hand side switch member in FIG. 3.
Figure 5:
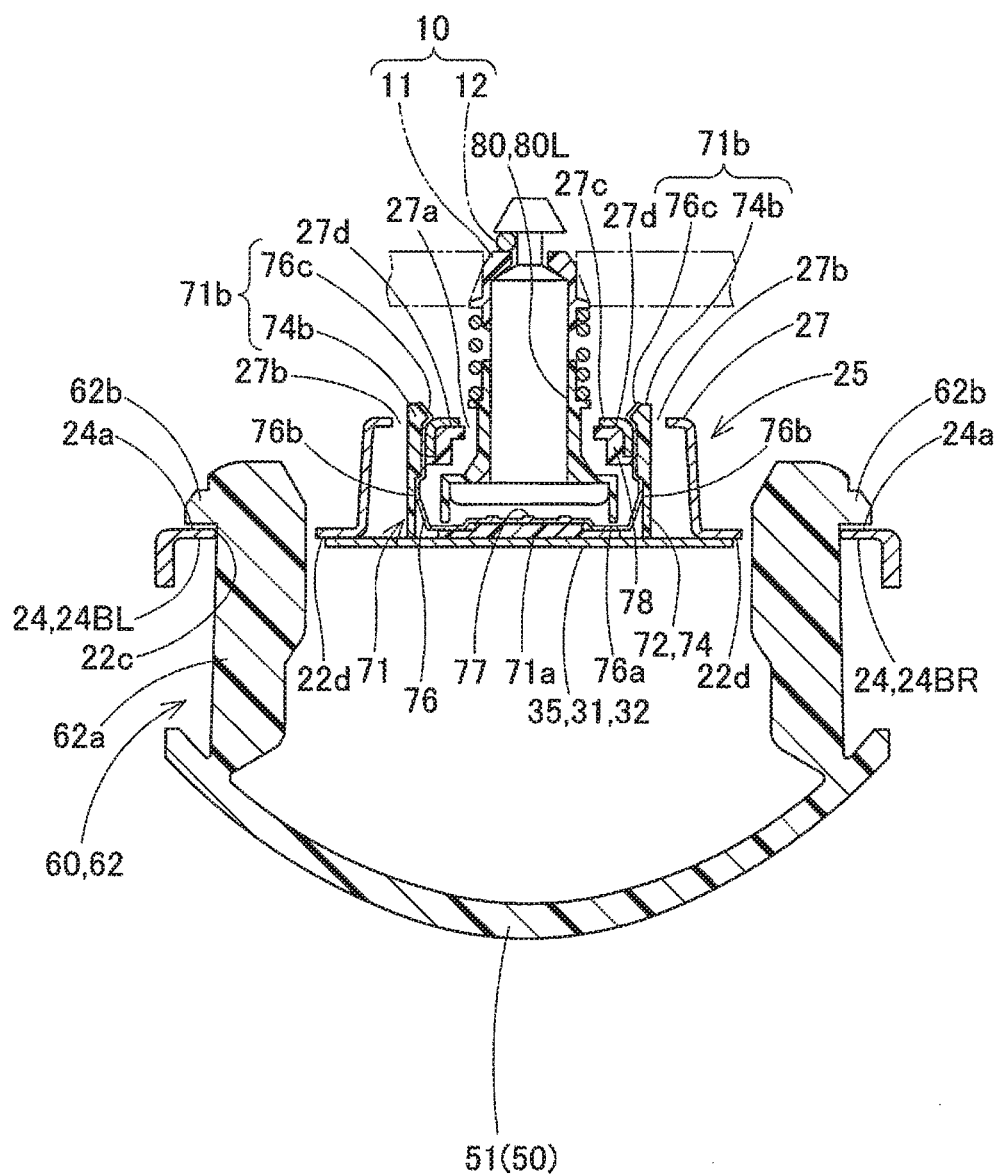
FIG. 5 is a schematic vertical sectional view of the air bag system of the first embodiment taken along a line V-V in FIG. 1, which shows a state in which a pad and a mounting base are connected together.

In the case of this embodiment, a substantially disc-shaped ornament 56 of synthetic resin is secured to an upper side of the door portion 52. As shown in FIG. 4, an outer circumferential edge 56a of the ornament 56 has a slightly larger shape than that of the breakable portion 54 so that an internal portion 56ai which is situated on the door portion 52 and an external portion 56ao which is disposed on an opening circumferential edge portion 55 which is not opened are provided near the breakable portion 54. Incidentally, when the door portion 52 is opened, the ornament 56 rotates together with the door portion 52, and the external portion 56ao on the outer circumferential edge 56a is disassembled from the opening circumferential edge portion 55.

As shown in FIGS. 3 to 8, on the side wall portion 60 of the pad 50, locking leg portions 61 are provided at two left- and right-hand side locations on an front edge side so as to be connected to holding seats 24 (24F) on a front edge side of the mounting base 21, and locking leg portions 62 are provided at two right-hand side locations and two left-hand side locations on a rear edge side. The locking leg portions 62 are connected to holding seats 24 (24BL, 24BR) which are disposed on left- and right-hand side locations on a rear edge side of the mounting base 21. The locking leg portions 61, 62 include vertical plate portions 61a, 62a which extend downwards from the ceiling wall portion 51 and locking head portions 61b, 62b which project radially outwards at lower ends of the vertical plate portions 61a, 62a. The vertical plate portions 61a, 62a are inserted individually through locking holes 22c in the holding seats 24F, 24BL, 24BR of the mounting base 21, and the locking head portions 61b, 62b are locked on a lower surface 24a at circumferential edges of the locking holes 22c (refer to FIG. 5), whereby the locking leg portions 61, 62 are locked on the corresponding holding seats 24F, 24BL, 24BR in such a way as to be restricted from being dislocated upwards.

Figure 11:
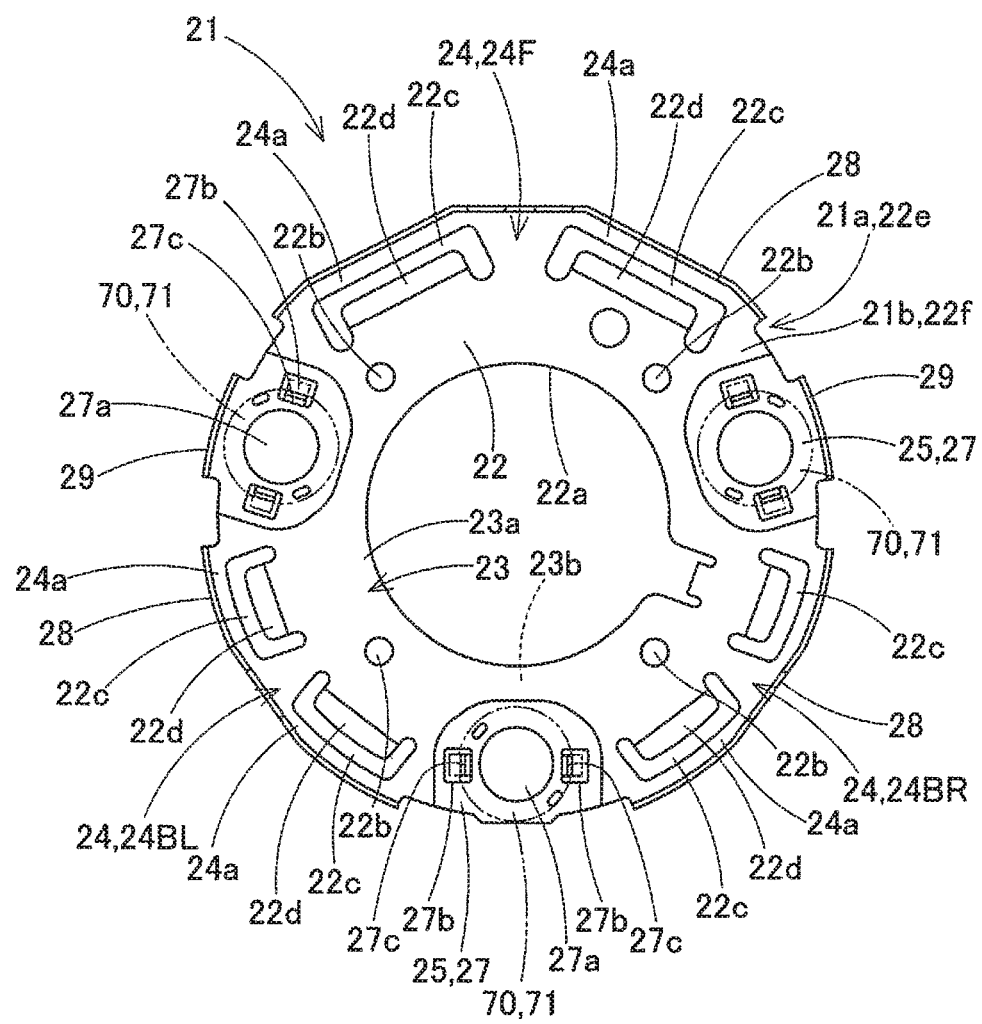
FIG. 11 is a plan view of the mounting base of the first embodiment.

On the side wall portions 60, pressing wall portions 64 are provided between the rear locking leg portions 62 which are separated from each other in the left-to-right direction on the rear edge side and the front locking leg portions 61 and the rear locking leg portions 62 which are separated from each other in the front-to-rear direction on the left- and right-hand sides. Then, lower end faces 64a of the pressing wall portions 64 so provided are brought into abutment with an upper surface 21b (22f) of an outer circumferential edge 21a (22a) of the mounting base 21 with an outer circumferential edge 34 of the inner plate 31 being interposed therebetween (refer to FIGS. 9, 11).

Figure 12:
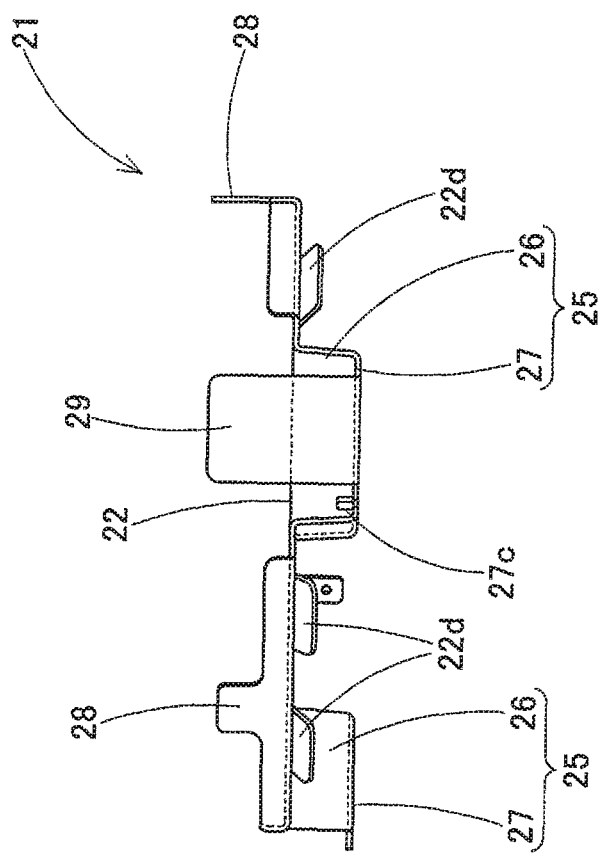
FIG. 12 is a side view of the mounting base of the first embodiment.

Then, the pad 50 is connected to the mounting base 21 without moving in the up-to-down direction, the front-to-rear direction and the left-to-right direction since the locking leg portions 61, 62 are prevented from being dislocated upwards from the holding seat 24 and the lower end faces 64a of the pressing wall portions 64 are in abutment with the upper surface 22f of the mounting base 21 via the inner plate 31. Tongue piece portions 22d of the holding seats 24 (24F, 24BL, 24BR) are bent downwards so as to keep the opening areas of the locking holes 22c wide before the locking leg portions 61, 62 are inserted through the locking holes 22c (refer to FIG. 12). After the locking leg portions 61, 62 are inserted through the locking holes 22c, the tongue piece portions 22d are restored from the bent state (are bent back upwards so as to continue to the circumference flat) since the tongue piece portions 22d push out the vertical plate portions 61a, 62a radially outwards so that the locking head portions 61b, 62b are locked on the lower surface 24a at the circumferential edges of the locking holes 22c.

The mounting base 21 is made of a metal plate and holds, as shown in FIGS. 1 to 4, 6, 11, 12, the air bag 45, the inflator 40 and the pad 50. Further, the mounting base 21 is configured as a metal plate member that attaches the air bag system 20 to the steering wheel main body 1 by making use of switch members 70. The mounting base 21 includes a substantially circular ring-shaped base plate portion 22, and vertical plate portions 28, 29 which project upwards from the vicinity of an outer circumferential edge 22e of the base plate portion 22.

The holding seats 24F are provided at left- and right-hand side locations on a front edge side of the base plate portion 22, and two locking holes 22c are provided in each of the holding seats 24F so as to lock the locking leg portions 61, 61 of the pad 50 therein. The two holding seats 24BL and two holding seats 24BR are provided at left- and right-hand side locations on a rear edge side of the base plate portion 22, respectively, and two locking holes 22c are provided in each of the left-hand holding seats 24BL and each of the right-hand holding seats 24BR, so that the locking leg portions 62 of the pad 50 are locked therein. As has been described above, the locking holes 22c and the tongue piece portions 22d are provided in each of the holding seats 24 (24F, 24BL, 24BR), and the tongue piece portions 22d are restored from the bent state so as to lock the locking head portions 61b, 62b after the locking leg portions 61, 62 are inserted through the corresponding locking holes 22c.

A substantially circular insertion hole 22a is opened in the center of the base plate portion 22 so as to correspond to the inlet opening 46 in the air bag 45, and a main body portion 40a of the inflator 40 can be inserted into the insertion hole 22a from therebelow. Additionally, four through holes 22b are formed along a circumferential edge of the insertion hole 22a, and the bolts 42b of the retainer 42 are put individually through the through holes 22b. The portion on the circumferential edge of the insertion hole 22a where the through holes 22b are provided constitutes a mounting seat 23 where the air bag 45, the inflator 40 and the inner plate 31 are mounted.

Assembling seats 25 where the switch members 70 are assembled are provided at three locations: a center of the rear edge side of the base plate portion 22 in relation to the left-to-right direction, in other words, between the rear holding seats 24BL, 24BR which are situated nearer to the center of the rear edge side of the base plate portion 22 while being separated from each other in the left-to-right direction; between the left front holding seat 24F and the other left rear holding portion 24BL; and between the right front holding seat 24F and the other right rear holding seat 24BR. The assembling seats 25 are each provided so as to be depressed downwards from the mounting seat 23. Namely, the assembling seats 25 each include a semi-cylindrical circumferential wall portion 26 which extends downwards from the mounting seat 23 and a substantially rectangular bottom wall portion 27 which is provided parallel to the mounting seat 23 at a lower end of the circumferential wall portion 26. The circumferential wall portion 26 is not provided on an outer circumferential edge 22e side of the base plate portion 22 to form a substantially semi-quadrangularly cylindrical shape.

A central circularly opened insertion hole 27a and two locking holes 27b are provided in the bottom wall portion 27 of each assembling seat 25, and the two locking holes 27b are disposed individually at two point symmetrical locations on the circumference of the insertion hole 27a. A shaft portion 86 of the assembling pin 84, which is a fixed-side member of each switch member 70, is inserted through the insertion hole 27a via insulating spacers 78, 79 having insulation properties and a spring seat 80. In the pair of locking holes 27b which are disposed on the circumference of the insertion hole 27a, a circumferential edge 27c facing the insertion hole 27a is cut to be raised so as to lock a locking portion 71b of a movable-side member 71 of the switch member 70 (refer to FIG. 5).

The vertical plate portions 28 are provided so as to project upwards from three locations between the assembling seats 25 on the outer circumferential edge 22e of the base plate portion 22. The vertical plate portions 29 are provided so as to project upwards from outer edges of the bottom wall portions 27 of the front left and right assembling seats 25.

The assembling seats 25 are disposed on a circular area which connects the holding seats 24 on the mounting base 21 which are provided about the insertion hole 22a (the inlet opening 46) so as to hold the pad 50, that is, an area where the folded air bag 45 is covered by the ceiling wall portion 51 and the side wall portion 60 of the pad 50 above the mounting base 21, in other words, an area below the folded air bag 45.

The inner plate 31 includes, as shown in FIGS. 1 to 5, 9, 10, a substantially annular ring plate 32, and control wall portions 38 which extend upwards from three locations on an outer circumferential edge 34 of the ring plate portion 32. A circular insertion hole 32a is opened in the center of the ring plate portion 32 so as to correspond to the inlet opening 46 of the air bag 45 and the insertion hole 22a of the mounting base 21, and the main body portion 40a of the inflator 40 can be inserted into the insertion hole 32a from therebelow. Additionally, four through holes 32b are formed along a circumferential edge of the insertion hole 32a for penetration of the bolts 42b of the retainer 42.

An inner circumferential edge 33 of the ring plate portion 32 is interposed between the circumferential edge 47 of the inlet opening 46 of the air bag 45 and the mounting seat 23 therebelow so that an upper surface 33a is brought into abutment with the circumferential edge 47 of the inlet opening 46 of the air bag 45 and a lower surface 33b is brought into abutment with the mounting seat 23 of the mounting base 21. When the retainer 42 is fastened to the mounting seat 23, the inner circumferential edge 33 of the ring plate portion 32 is fastened to the mounting seat 23 of the mounting base 21 together with the circumferential edge 47 of the inlet opening 46.

The ring plate portion 32 is formed into a substantially ring-shaped flat plate, and cover portion 35 are provided on an outer circumferential edge 34 side of the ring plate portion 32 in such a way as to correspond to the assembling seats 25 of the mounting base 21 so as to cover the assembling seats 25 from thereabove. The cover portions 35 are configured so that upper surfaces 71a of the movable-side members 71, which will be described later, of the switch members 70 are brought into abutment with lower surfaces 35b and the lower end faces 64a of the pressing wall portions 64 of the pad 50 are brought into abutment with upper surfaces 35a of the cover portions 35. The locking leg portions 61, 62 of the side wall portion 60 of the pad 50 which are locked in the locking holes 22c in the mounting base 21 are inserted through recess portions 36 which are provided along the outer circumferential edge 34 so as to be recessed between the cover portions 35 (refer to FIG. 9).

In the case of the first embodiment, the cover portions 35 are provided so as to be brought into abutment substantially wholly with the upper surfaces 71a of the movable-side members 71 which lie above areas which are defined above at least coil springs 89 acting as a biasing device, which will be described later.

The control wall portions 38 are provided so as to project upwards from outer edges of the cover portions 35 and are disposed to lie on outer circumferential surfaces of the pressing wall portions 64 of the pad 50, whereby the control wall portions 38 prevent the deformation of the pressing wall portions 64 which are pressed by the air bag 45 when it is inflated.

The switch members 70 make up a horn switch mechanism (a horn switch) 69 and each include, as shown in FIGS. 2 to 5, the movable-side member 71 having a movable-side contact 77 which is disposed on an upper side, a fixed-side member 82 having a fixed-side contact 87 which is disposed on a lower side, the coil spring 89 which makes up a biasing device, and a controlling device 88 which controls a distance (corresponding to a horn stroke) over which the fixed-side contact 87 and the movable-side contact 77 are spaced apart from each other.

The movable-side members 71 each include an insulating cap 72 of synthetic resin, a movable-side contact material 76 having the movable-side contact 77, the insulating spacers 78, 79, and the spring seat 80. The cap 72 includes a substantially circular top plate portion 73 and a cylindrical portion 74 having a substantially circularly cylindrical shape which extends downwards from a circumferential edge of the top plate portion 73. In each assembling seat 25, an upper surface of the cap 72 acts as the upper surface 71a of the movable-side member 71 and is brought into abutment with the lower surface 35b of the cover portion 35 of the inner plate 31, and a lower end of the cylindrical portion 74 extends as far as near the bottom wall portion 27 of the assembling seat 25.

In other words, a depth of the depression from the mounting seat 23 on the bottom wall portion 27 of each mounting seat 25 of the mounting base 21 corresponds to a height dimension of the cap 72 of the movable-side member 71 so that the cap 72 can be accommodated in the depression.

The movable-side contact material 76 is formed of a conductive material such as copper and includes a horizontal rod portion 76a which is supported by a supporting seat 73a on a lower side of the top plate portion 73 of the cap 72 and vertical rod portions 76b which extend downwards from left and right ends of the horizontal rod portion 76a. Lower ends of the vertical rod portions 76b fit on an elongated projecting portion 74*b* on an inner circumferential surface at a lower end of the cylindrical portion 74 of the cap 72, making up the locking portion 71*b* of the movable-side member 71 together with the elongated projecting portion 74*b* (refer to FIG. 5). As has been described before, the locking portion 71*b* constitutes the portion which is locked on the circumferential edge 27*c* of the locking hole 27*b* in each assembling seat 25 of the mounting base 21, whereby the movable-side member 71 is assembled to the assembling seat 25 thereat.

A plurality of movable-side contacts 77 which protrude downwards are provided on the horizontal rod portion 76*a* of the movable-side contact material 76.

The spring seat 80 is formed into a stepped cylindrical shape and includes a large-diameter portion 80*a* which guides a vertical motion of a collar portion 85 at an upper end of the assembling pin 84 and a small-diameter portion 80*b* which is brought into abutment with an upper end of the coil spring 89 which is fitted on an outer circumference of the shaft portion 86. In the spring seat 80, the large-diameter portion 80*a* is placed inside the cap 72 and an upper end is brought into abutment with the top plate portion 73.

The insulating spacer 78 is locked at a lower end of the cylindrical portion 74 on an inner circumferential side of the cap 72, and the insulating spacer 79 is configured to cause a biasing force of the coil spring 89 to act smoothly on the mounting base 21 via the large-diameter portion 80*a* of the spring seat 80, the top plate portion 73 of the cap 72 and the cover portion 35 of the inner plate 31 between an upper end of the small-diameter portion 80*b* of the spring seat 80 and the insulating spacer 78.

Incidentally, in the case of the first embodiment, the collar portion 85 of the assembling pin 84 which doubles as the fixed-side contact 87 thereof is brought into abutment with a step surface 80*c* of the large-diameter portion 80*a* of the spring seat 80 which receives the biasing force of the coil spring 89 to thereby be brought into abutment with the top plate portion 73 having the movable-side contacts 77 provided thereon at an upper end, whereby the spacing distance between the movable-side contacts 77 and the fixed-side contact 87 is controlled. Thus, the control device 88 which controls the spacing distance between the movable-side contacts 77 and the fixed-side contact 87 is made up of the large-diameter portion 80*a* of the spring seat 80 having the step surface 80*c* and the collar portion 85.

The fixed-side member 82 includes a substantially cylindrical cover 83 of synthetic resin and the assembling pin 84. The assembling pin 84 is formed of a conductive metallic material such as steel and includes the shaft portion 86 which extends in the up-to-down direction to project downwards from the insertion hole 27*a* in the assembling seat 25 and the disc-shaped collar portion 85 which projects greater than a diametric dimension of the insertion hole 27*a* in a direction which is at right angles to the shaft portion 86 at an upper end side of the shaft portion 86 to thereby be locked on the step surface 80*c* of the large-diameter portion 80*a* of the spring seat 80. A locking recess portion 86*b* is provided circumferentially at a lower end of the shaft portion 86, and the locking head portion 86*a*, having a tapered shape like a frustum of a cone, is formed at a distal end side of the locking recess portion 86*b*.

The cover 83 fits in the locking recess portion 86*b* at a distal end side and supports a lower end of the coil spring 89 at an upper end thereof.

In this fixed-side member 82, the locking head portion 86*a* of the assembling pin 84 is inserted through the locking hole 11 in the predetermined fixing portion 10 of the steering wheel main body 1, and the locking pin 12 is deflected to be disposed in the locking recess portion 86*b* of the assembling pin 84. Then, the assembling pin 84 is fixed to the fixing portion 10 while its movement in the up-to-down direction is restricted. Then, since the cover 83 is inserted into the locking hole 11, the generation of abnormal noise can be prevented, and the assembling pin 84 and a lower end side of the coil spring 89 can be fixedly attached to the fixing portion 10.

Additionally, fixing the lower end side of the coil sprig 89 to the fixing portion 10 of the steering wheel main body 1 can bias the mounting base 21 in an upward direction in which the mounting base 21 is spaced apart from the fixed-side member 82 via the large-diameter portion 80*a* of the spring seat 80, the top plate portion 73 of the cap 72 and the cover portion 35 of the inner plate 31. Then, a predetermined spacing distance is ensured between the fixed-side contact 87 which is made up of the collar portion 85 and the movable-side contacts 77 which are disposed on the lower surface of the top plate portion 73 by the large-diameter portion 80*a* which makes up the control device 88 and the collar portion 85 which is pressed against the step surface 80*c* of the large-diameter portion 80*a* by means of the biasing force of the coil spring 89.

Fixing the assembling pin 84 to the fixing portion 10 brings the assembling pin 84 into contact with the core metal 2 via the locking pin 12, whereby the fixed-side contact 87 electrically communicates with a negative side of a horn operating circuit. The movable-side contact material 76 come into contact with the circumferential edge of the locking hole 27*b* in the mounting base 21 to which a lead wire, not shown, which electrically communicates with a positive side of the horn operating circuit is connected, whereby the movable-side contacts 77 electrically communicate with the negative side and the positive side of the horn operating circuit.

In the air bag system 20 of the first embodiment, when assembling the air bag system 20, firstly, the retainer 42 is placed in the interior of the air bag 45 with the bolts 42 caused to project from the through holes 47*a*. Then, the air bag 45 is folded and is wrapped with a wrapping material, not shown, which prevents the collapse of the folded air bag 45. The switch members 70 which have been built up with the locking portions 71*b* locked on the circumferential edges of the locking holes 27*b* are assembled in advance to the assembling seats 25 of the mounting base 21.

Then, the bolts 42*b* are passed through the through holes 32*b* of the inner plate 31, the through holes 22*b* of the mounting base 21 and the through holes 40*d* of the inflator 40. Then, the nuts 43 are fastened on to the corresponding bolts 42*b* to mount the air bag 45, the inner plate 31 and the inflator 40 on the mounting base 21.

With the control wall portions 38 of the inner plate 31 disposed on the outer circumferential surfaces of the pressing wall portions 64 of the pad 50, the locking head portions 61*b*, 62*b* of the locking legs 61, 62 are inserted through the corresponding locking holes 22*c* of the holding seats 24 on the mounting base 21. Further, the tongue piece portions 22*d* are restored from the bent states so that the locking head portions 61*b*, 62*b* are locked on the lower surfaces 24*a* of the circumferential edges of the locking holes 22*c*. As this occurs, the lower end faces 64*a* of the pressing wall portions 64 of the side wall portion 60 of the pad 50 are brought into abutment with the upper surfaces 35*a* on the outer edge sides of the cover portions 35 of the inner plate 31. This restricts the side wall portion 60 from moving downwards relative to the mounting base 21 via the inner plate 31. The locking of the locking head portions 61*b*, 62*b* on the circumferential edges of the locking holes 22*c* restricts the side wall portion 60 from moving upwards relative to the mounting base 21. Thus, the pad 50 is connected to the mounting base 21, completing the assemblage of the air bag system 20.

In mounting the air bag system 20 on the vehicle, the locking head portions 86*a* of the assembling pins 84 of the switch members 70 are inserted through the locking holes 11 of the fixing portions 10 of the steering wheel main body 1 which has already been assembled to the steering shaft SS, and the locking pins 12 are fitted in the locking recess portions 86*b*, whereby the air bag system 20 can be mounted on the steering wheel main body 1, completing the assemblage of the steering wheel W. Then, the steering wheel W can be mounted on the vehicle together with the air bag system 20.

When the air bag system 20 is mounted on the steering wheel main body 1, the lead wire, not shown, of the mounting base 21 is connected to the positive side of the horn operating circuit, and an operation signal input lead wire, not shown, is connected to the inflator 40.

After the air bag system 20 is mounted on the vehicle, when an operation signal is inputted into the inflator 40, the inflator 40 discharges the inflation gas from the inflation gas outlet ports 40*b*, whereby the inflation gas flows into the air bag 45, which is then inflated. Then, the inflated air bag 45 pushes open the door portion 52 of the ceiling wall portion 51 of the pad 50, whereby the air bag 45 projects from an opening formed in the door portion 52 and is then deployed to inflate so as to cover the upper surface of the ring portion R from above the boss portion B (refer to a chain double-dashed line in FIG. 1).

In a normally used state where the inflator 40 is left inactive, in the event that the pad 50 is depressed so as to operate the horn switch 69, the cover portions 35 of the inner plate 31 which are in abutment with the lower end faces 64*a* of the pressing wall portions 64, the top plate portions 73 of the movable-side members 71 of the switch members 70 which are in abutment with the lower surfaces 35*b* of the cover portions 35 on the upper surfaces 71*a* thereof and the movable-side contacts 77 which are supported on the lower sides of the top plate portions 73 are lowered, and the movable-side contacts 77 are brought into contact with the fixed-side contact 87, whereby the horn operating circuit is switched ON, activating a predetermined horn operation.

In the air bag system 20 of the first embodiment, the switch members 70 are disposed below the folded air bag 45 which is mounted on the mounting base 21, in other words, the switch members 70 are disposed inside and at lower portions of the side wall portion 60 of the pad 50 which surrounds the circumference of the folded air bag 45. Thus, the assembling seats 25 of the mounting base 21 to which the switch members 70 are assembled are also disposed accordingly below the folded air bag 45 and are placed so as to be close to the inlet opening 46 of the air bag 45. This allows the outer circumferential edge 21*a* (22*e*) of the mounting base 21 to lie to be close to the inlet opening 46 of the air bag 45, whereby the air bag 45 can be placed compact on the mounting base 21 when seen from thereabove. In association with this, the side wall portion 60 of the pad 50 can also be configured without a portion which is largely spaced apart from the inlet opening 46 of the air bag 45, as a result of which the whole of the air bag system 20 can be configured compact when seen from thereabove.

When depressing the pad 50 to activate the horn switch 69, the upper surfaces 71*a* of the movable-side members 71 are depressed substantially wholly by the inner plate 31 which is fastened together with the circumferential edge 47 of the inlet opening 46 of the air bag 45 by the retainer 42, and therefore, the movable-side members 71 are prevented from being inclined, whereby the upper surfaces 71*a* can be lowered uniformly. Because of this, although the mounting base 21 is made compact, a stable horn stroke can be ensured, thereby making it possible to prevent a reduction in feeling a sensation of depressing the pad 50 to activate the horn switch 69.

Consequently, in the air bag system 20 of the first embodiment, even in the event that the air bag system 20 is mounted on the upper portion of the boss portion B of the steering wheel W, the air bag system 20 can be mounted compact when seen from thereabove. Additionally, when operating the horn switch 69, a good operation feeling can be ensured.

In addition, in the air bag system 20 of the first embodiment, the retainer 42 is formed substantially into the quadrangular annular shape, and the bolts 42*b*, which are the securing devices to be fixed to the mounting base 21, are provided in the four front, rear, left and right corners of the retainer 42 so shaped so as to extend downwards. Then, the three switch members 70 are used: the switch members 70L, 70R are disposed in the left and right positions on the front side of the circumference of the inlet opening 46 of the air bag 45, and the switch member 70B is disposed near the rear side of the retainer 42 in the central position in the left-to-right direction of the retainer 42 (refer to FIG. 9).

Because of this, in the first embodiment, the switch members 70 (70L, 70R, 70B) can be disposed nearest to the inlet opening 46 of the air bag 45 without interfering with the bolts 42*b* in the four corners of the retainer 42, which can contribute further to making the air bag system 20 compact. Additionally, the switch members 70 are disposed in the three locations which are deployed radially about the inlet opening 46 of the air bag 45. Therefore, even in the event that the portions where the pad 50 is depressed scatter differently in the front-to-rear and left-to-right directions, the movable-side contacts 77 of any one of the three switch members 70 can be brought into contact with the fixed-side contact 87 with good balance, thereby making it possible to maintain the good operation feeling.

Figure 13:
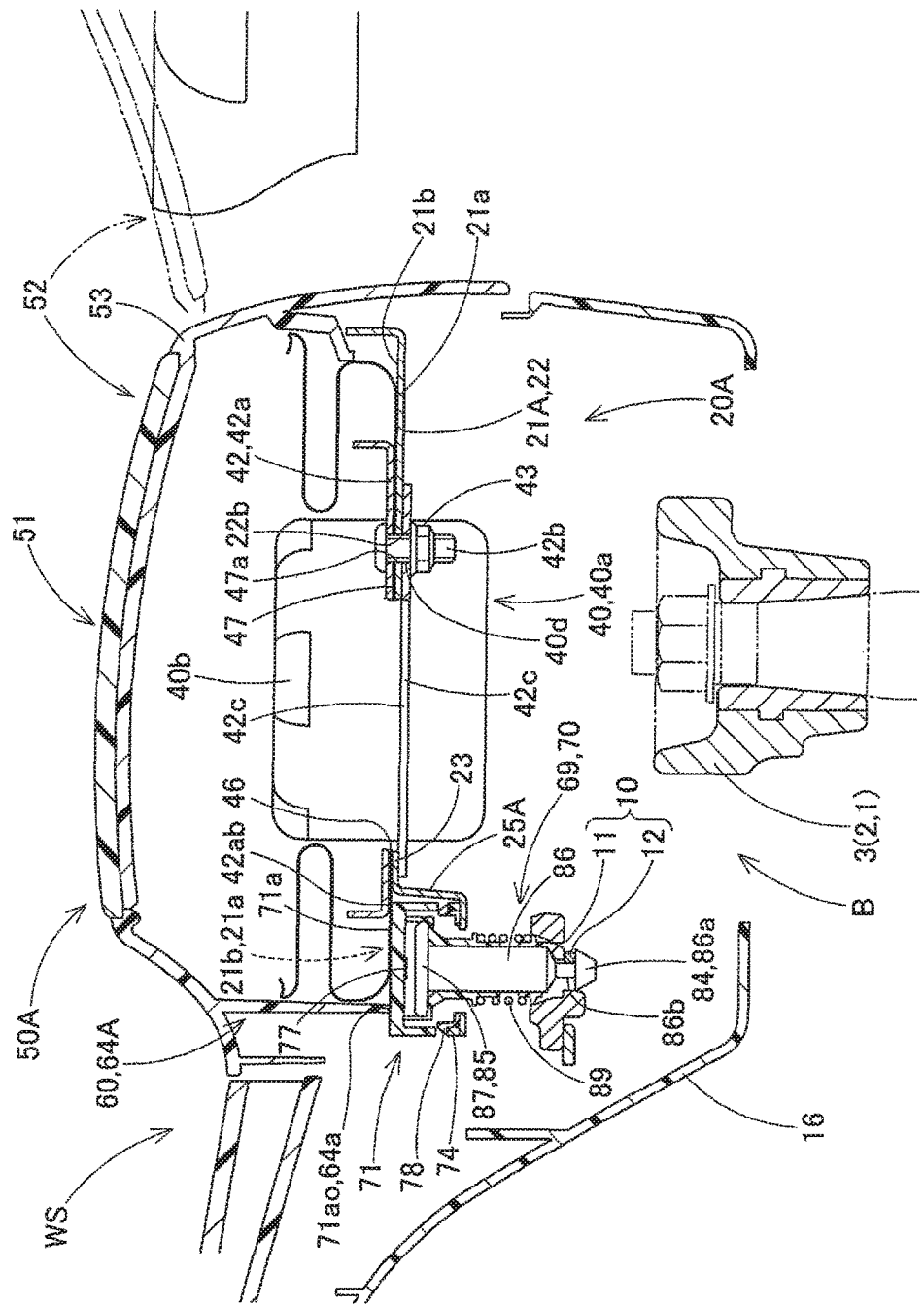
FIG. 13 is a schematic vertical sectional view taken along a front-to-rear direction of an air bag system of a second embodiment.
Figure 14:
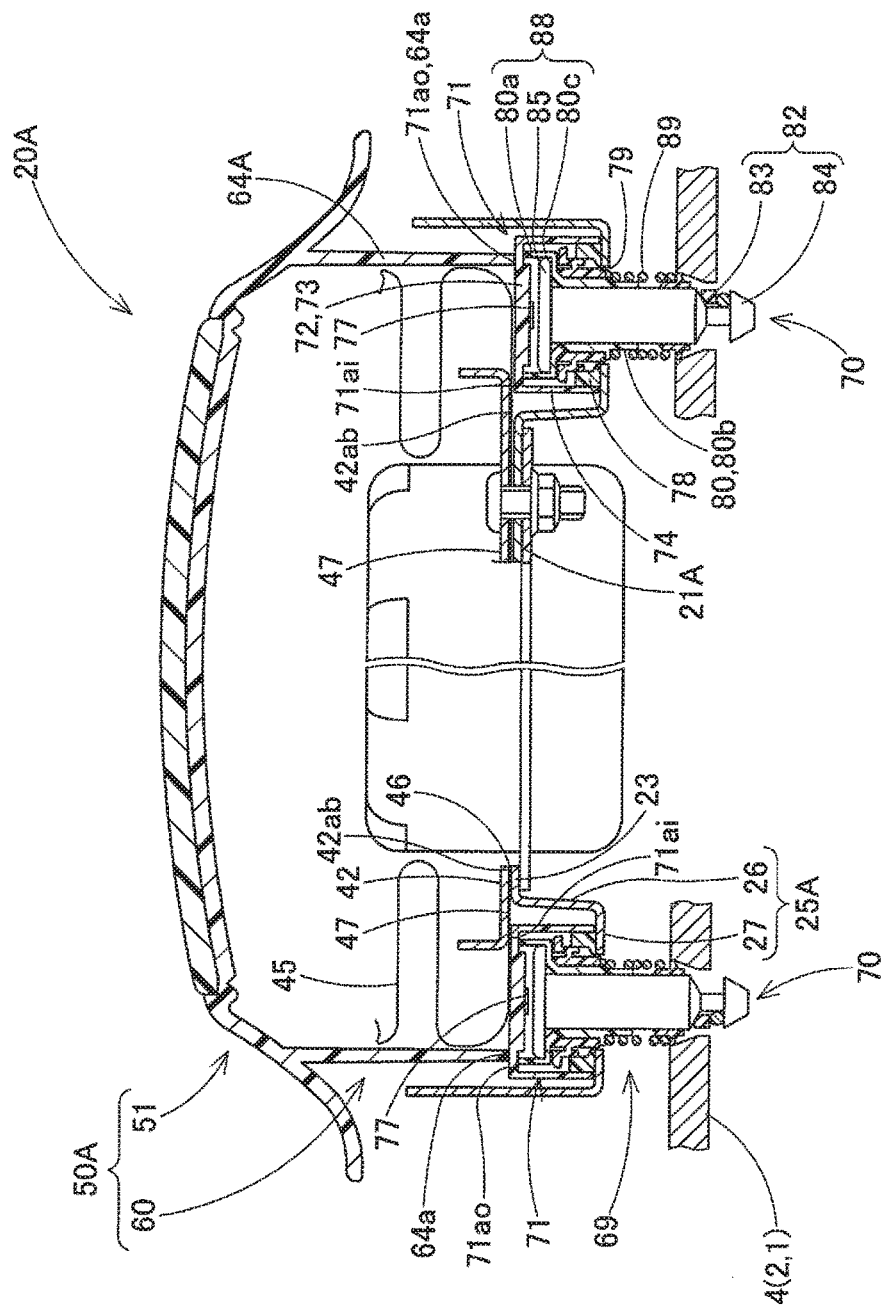
FIG. 14 is a schematic vertical sectional view taken along a left-to-right direction of the air bag system of the second embodiment.

Although the air bag system 20 of the first embodiment includes the inner plate 31, as in an air bag system 20A of a second embodiment shown in FIGS. 13, 14, a configuration may be adopted in which no inner plate 31 is used.

In this air bag system 20A, similar to the first embodiment, assembling seats 25A are provided on a mounting base 21A in such a way as to be depressed downwards from a mounting seat 23, and the mounting base 21A is provided in an area defined below a folded air bag 45 together with switch members 70 which are assembled to the assembling seats 25A. However, in the second embodiment, no inner plate 31 is used. The switch member 70 which is assembled to each assembling seat 25A is provided so that a portion 71*ai* of an upper surface 71*a* which faces an inlet opening 46 is brought into abutment with a lower surface 42*ab* of a retainer 42 via a circumferential edge 47 of the inlet opening 46 and a portion 71*ao* of the upper surface 71*a* which is spaced away from the inlet opening 46 is brought into abutment with a lower surface (a lower end face) 64*a* of a pressing wall portion 64A of a side wall portion 60 of a pad 50A.

The air bag system 20A of the second embodiment differs from the air bag system 20 of the first embodiment only in that the assembling seats 25A of the mounting base 21A and the pressing wall portions 64A of the pad 50A are disposed in different positions from those of the first embodiment.

Hence, the other portions of the mounting base 21A and the pad 50A or the other constituent parts such as an inflator 40, the retainer 42, the air bag 45 and the switch members 70 remain the same as those of the first embodiment. Thus, like reference numerals will be given to like portions and parts to those of the first embodiment, and the description thereof will be omitted here.

Similar to the first embodiment, the air bag 45 and the inflator 40 are fixedly mounted on the mounting base 21A by passing bolts 42b of the retainer 42 through predetermined through holes 47a, 22b, 40d and fastening nuts 43 on to the bolts 42b. Further, the pad 50A is fixed to the mounting base 21A while being restricted from moving in an up-to-down direction by locking predetermined locking leg portions 61, 62, not shown, which extend downwards from a lower surface of a circumferential portion of a door portion 52 in a ceiling wall portion 51 on corresponding holding seats 24 on the mounting base 21A which each have locking holes 22c and a tongue piece portion 22d, which are not shown and bringing lower end faces 64a of the pressing wall portions 64A into abutment with an upper surface 21b of the mounting base 21A at the circumferences of the assembling seats 25. Additionally, similar to the first embodiment, the switch members 70 are assembled to the corresponding assembling seats 25A which are disposed at three locations which are positioned radially about the inlet opening 46 of the air bag 45 with locking portions 71b of movable-side members 71 locked in locking holes 27b, not shown. Further, similar to the first embodiment, the air bag system 20A of the second embodiment is mounted on a steering wheel W by inserting assembling pins 84 of the switch members 70 in corresponding fixing portions 10 of a steering wheel main body 1 to be locked therein.

In the air bag system 20A of the second embodiment, too, the switch members 70 are provided below the folded air bag 45 on the mounting base 21A, and therefore, the assembling seats 25A of the mounting base 21A are also disposed below the folded air bag 45 accordingly while being provided close to the inlet opening 46 of the air bag 45. This allows the mounting base 21A to dispose its outer circumferential edge 21a to lie close to the inlet opening 46 of the air bag 45, whereby the mounting base 21 can be configured compact when seen from thereabove. In association with this, the side wall portion 60 of the pad 50A can also be configured without a portion which lies spaced away largely from the inlet opening 46 of the air bag 45, as a result of which the whole of the air bag system 20A can be configured compact when seen from thereabove.

In addition, in depressing the pad 50A to activate a horn switch 69, on the upper surfaces 71a of the movable-side members 71, portions 71ai facing the inlet opening 46 of the air bag 45 are depressed by the retainer 42 which is fixed to the mounting base 21A to which the side wall portion 60 of the pad 50A is connected and portions 71ao which lie away from the inlet opening 46 is depressed by a lower surface 64a of the side wall portion 60 of the pad 50A. Thus, the movable-side members 71 are prevented from being inclined, whereby the upper surfaces 71a can be lowered uniformly. Because of this, although the mounting base 21A is made compact, a stable horn stroke can be ensured, and a reduction in feeling the sensation of operating the pad 50A can be prevented, thereby making it possible to obtain the same working effect as that of the first embodiment.

In the first embodiment, the single inner plate 31 is brought into abutment substantially wholly with the upper surfaces 71a of all the switch members 70, in other words, the single inner plate 31 is brought into abutment substantially wholly with the upper surfaces 71 which lie higher than at least the coil springs 89 as the biasing device, and therefore, the contact state of the movable-side contacts 77 with the fixed-side contact 87 can be stabilized by each switch member 70.

In the first and second embodiments, while the three switch members 70 are described as being provided, a configuration may be adopted in which switch members 70 are provided at four locations near the retainer 42 which scatter in different positions in the front-to-rear and left-to-right directions of the quadrangular annular retainer 42.

What is claimed is:

1. An air bag system comprising:
    a pad comprising a ceiling wall portion which covers an air bag which is folded from thereabove and which has a door portion which is pushed to open by the air bag when the air bag is inflated and a side wall portion which extends into a cylindrical shape from a lower surface of the ceiling wall portion at a circumference of the door portion to thereby cover sides of the air bag which is folded and disposed on an upper side of a boss portion of a steering wheel;
    a mounting base which holds the pad by causing the side wall portion to be connected thereto and which holds the air bag by causing an annular retainer which fastens a circumferential edge on an inner circumferential surface side of an inflation gas inlet opening which is provided in the air bag to be fixed thereto; and
    a plurality of switch members which make up a horn switch mechanism which are mounted on assembling seats near an outer circumferential edge of the mounting base so that the mounting base can be mounted on a steering wheel main body,
    the switch member comprising:
        a movable-side member which is disposed on an upper side, which has a movable-side contact and which is assembled to the assembling seat of the mounting base;
        a fixed-side member which is disposed on a lower side, which has a fixed-side contact which corresponds to the movable-side contact at an upper end side and which is attached to the steering wheel main body at a lower end side which projects downwards from the mounting base;
        a biasing device which biases upwards a side facing the mounting base from a side facing the fixed-side member; and
        a control device which controls a spacing distance of the movable-side contact from the fixed-side contact,
    wherein:
    the switch members are provided below the air bag which is folded on the mounting base; and
    movable-side members are provided so that a portion at a side facing the inlet opening on an upper side thereof is brought into abutment with the retainer via a circumferential edge of the inlet opening of the air bag.

2. The air bag system according to claim 1, wherein:
    the movable-side members are provided so that a portion at a side thereof which lies spaced away from the inlet opening on the upper side is brought into abutment with a lower surface of the side wall portion of the pad.

3. The air bag system according to claim 1, wherein:
    the retainer is formed substantially into a quadrangular annular shape in which securing devices which are fixed to the mounting base are provided in four front, rear, left and right corners thereof so as to extend downwards therefrom; and three switch members are used as the plurality of switch members and are provided in left and right positions on a front side of the circumference of the inlet opening of the air bag which lie near and behind the front securing devices of the retainer and a central position in a left-to-right direction of the retainer on a rear side which lies near the retainer.

* * * * *